US008676985B2

(12) United States Patent
Assuncao et al.

(10) Patent No.: US 8,676,985 B2
(45) Date of Patent: Mar. 18, 2014

(54) SYSTEM, METHOD AND PROGRAM PRODUCT FOR LOCAL CLIENT DEVICE CONTEXT-AWARE SHARED RESOURCE AND SERVICE MANAGEMENT

(75) Inventors: Marcos Dias De Assuncao, Sao Paulo (BR); James R. Kraemer, Santa Fe, NM (US); Fernando Luiz Koch, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/555,113

(22) Filed: Jul. 21, 2012

(65) Prior Publication Data

US 2014/0006602 A1 Jan. 2, 2014

Related U.S. Application Data

(63) Continuation of application No. 13/534,316, filed on Jun. 27, 2012.

(51) Int. Cl.
*G06F 15/173* (2006.01)

(52) U.S. Cl.
USPC ........................................................ 709/226

(58) Field of Classification Search
USPC .......... 709/204–206, 224–229; 705/1, 5, 6, 8, 705/9; 455/418, 566
See application file for complete search history.

(56) References Cited

U.S. PATENT DOCUMENTS

| | | | |
|---|---|---|---|
| 5,493,692 A | 2/1996 | Theimer et al. | |
| 6,115,640 A | 9/2000 | Tarumi | |
| 8,082,226 B2 * | 12/2011 | Ayotte et al. | 707/636 |
| 8,229,909 B2 * | 7/2012 | Wang et al. | 707/705 |
| 8,250,213 B2 * | 8/2012 | Glover et al. | 709/226 |
| 2007/0250628 A1 * | 10/2007 | Katoh et al. | 709/225 |
| 2010/0146109 A1 * | 6/2010 | Yoon | 709/224 |
| 2010/0250530 A1 * | 9/2010 | Wang et al. | 707/732 |
| 2010/0257143 A1 | 10/2010 | Sosnosky et al. | |
| 2011/0022438 A1 * | 1/2011 | Lian | 705/8 |
| 2011/0060808 A1 | 3/2011 | Martin et al. | |
| 2011/0136542 A1 * | 6/2011 | Sathish | 455/566 |
| 2012/0149352 A1 * | 6/2012 | Backholm et al. | 455/418 |
| 2012/0166517 A1 * | 6/2012 | Lee et al. | 709/202 |

OTHER PUBLICATIONS

Netto, M. A. S. (2009). Adaptive Co-Allocation of Distributed Resources for Parallel Applications (Doctoral dissertation, University of Melbourne, Department of Computer Science and Software Engineering), hereafter "Netto".*

(Continued)

*Primary Examiner* — Asad Nawaz
*Assistant Examiner* — Berhanu Belete
(74) *Attorney, Agent, or Firm* — Law Office of Charles W. Peterson, Jr.; Louis J. Percello, Esq.

(57) ABSTRACT

A system context aware resource management, method of managing shared resources and services and a computer program product therefor. Client devices, e.g., handheld or mobile devices, request resources from provider computers, e.g., in a cloud environment. The provider computers provide cloud-based personal assistants. Resource requests from client devices may be context related that may be provided in response to a selected context. A resource management system schedules resource processing for requesting mobile client devices, initially, and responds to device context changes by selectively adjusting shared resource job priorities, e.g., creating a new job, pausing or restarting/resuming a respective job.

24 Claims, 7 Drawing Sheets

(56) References Cited

OTHER PUBLICATIONS

Feitelson et al., "Parallel job scheduling—a status report" Proceedings of JSSPP, 2005.

Takefusa et al., "A Study of Deadline Scheduling for Client-Server Systems on the Computational Grid," Proceedings of HPDC, 2001.

Koch, F.L. et al., "Enhanced Deliberation Behaviour for BDI-Agents in Mobile Services," Proceeding of the 8th International Conference on Practical Applications of Agents and Multi-Agent Systems (PAAMS10), Advances in Intelligent and Soft Computing 70, Pub Springer, ISBN 978-3-642-12383-2, pp. 59-68 (2010).

Capra, L et al., "CARISMA: context-aware reflective middleware system for mobile applications," IEEE Transactions on Software Engineering, vol. 29. IEEE Computer Society, ISSN 0098-5589, pp. 929-945 (2003).

\* cited by examiner

SYSTEM, METHOD AND PROGRAM PRODUCT FOR LOCAL CLIENT DEVICE CONTEXT-AWARE SHARED RESOURCE AND SERVICE MANAGEMENT

CROSS REFERENCE TO RELATED APPLICATION

The present invention is a continuation of U.S. application Ser. No. 13/534,316, "SYSTEM, METHOD AND PROGRAM PRODUCT FOR LOCAL CLIENT DEVICE CONTEXT-AWARE SHARED RESOURCE AND SERVICE MANAGEMENT" to Marcos Dias De Assuncao et al.; filed Jun. 27, 2012, assigned to the assignee of the present invention and incorporated herein by reference.

BACKGROUND OF THE INVENTION

1. Field of the Invention

The present invention is related to allocating resources amongst multiple computers and more particularly to managing and allocating resources for cloud-based personal assistants.

2. Background Description

Recently, cloud computing has offered great opportunities for a broad range of applications. Cloud service providers (e.g., with mainframe computers) share Information Technology (IT) infrastructure with users/clients, connected together over networks in what constitutes a client-cloud system. The shared IT infrastructure (the cloud computers) provides end-user content and support, i.e., supply services and resources and handle data-intensive computing tasks for the clients. This has allowed user client devices to become much more lightweight and mobile and small enough to be hand held. Further, these lightweight, mobile devices still provide users with access to resources managed by the larger shared resource providers, allowing end-users access to cloud services through handheld devices.

Typically, cloud resources are allocated in response to prior requests. However, clients may request services/resources on the fly, when a need arises. This has resulted in periods of heavy utilization or peaks, e.g., during the workday, and low utilization or valleys, e.g., at night. Thus, service providers have sought to reactively and pro-actively set job priorities context-sensitively to optimize resource utilization, e.g., timing resource production to be available just as they are needed. In a fixed client environment, e.g., personal computers in an office environment, setting priorities for jobs may be a relatively straightforward task. In mobile personal assistance environment, however, targeting timely delivery for end-user support content, imposes mobility, dynamic environment and context-sensitivity issues that impact the timing and relevant context of the delivery area, i.e., what are known as "windows of opportunity."

For what are commonly referred to as "cloud-based personal assistants" job processing typically refers to processing files (such as documents, graphs or videos), notifications, and any other computing support and communications with demands that exceed handheld device capabilities and efficiency. Processing elements that demand capacity, typically, are delegated to the cloud. Preferably, the cloud delivers the content for these elements in relevant end-user contexts. For example, the cloud may deliver documents for scheduled meetings just prior to, but close to, the scheduled meeting times. Timely delivery, however, not too early and not too late, may overload resources at that time, spiking cloud computing resource utilization and communications requirements. Alternatively, to minimize risk of tardy content deliveries, the cloud may deliver content early, which may unduly burden local resources, e.g., occupying handheld device space that might otherwise be used prior to the meeting for other, more timely matters.

Some prior approaches have been server centric, focusing on server-based job performance. Jobs, and in particular, complex and intricate jobs were scheduled according to cloud infrastructure (e.g., a server) deadlines, priorities and performance predictions. However, the variations of the end-user local context have not been considered in adjusting server-based job scheduling. Other approaches have focused on using local context reasoning to enhance handheld device processing deliberation and performance. Yet other approaches have extended these local processing performance enhancement approaches to further enhance bandwidth utilization, memory consumption, and connectivity.

These prior approaches to providing cloud support for handheld devices optimize for cloud requirements, without considering local contexts; or, optimize for local performance and response without considering cloud contexts. Consequently, there may be considerable wasted resources from processing existing job content that, because the mobile user's local context has changed, is no longer relevant in the current local context. For a single mobile device user this waste is insignificant. However, where a large number mobile users are accessing the cloud for one or more personal assistant jobs, they combine for a much more significant effect with a highly dynamicity delivery environment.

Thus, there is a need for flexibly scheduling and executing jobs in the cloud for local delivery, responding to local context variations, to minimize wasted resources from processing stale job content based on out of date contexts; and in particular, where a large number of personal assistants may have active jobs processing in a highly dynamic delivery environment.

SUMMARY OF THE INVENTION

A feature of the invention is a shared resource system and method for timely managing provisioning to mobile client devices responsive to local contexts;

Another feature of the invention is a shared resource system and method of providing resources to handheld client devices and monitoring respective local contexts and managing off-line job processing of the handheld client device jobs in response to changes in local context;

Yet another feature of the invention is a cloud-based shared resource system and method of providing context sensitive cloud-based personal assistants and managing client job processing, wherein handheld clients with pending requests for service are monitored for local context changes and off-line job processing is selectively adjusted in response to local context changes.

The present invention relates to a context aware resource management system, method of managing shared resources and services and a computer program product therefor. Client devices, e.g., handheld or mobile devices, request resources from provider computers, e.g., in a cloud environment. The provider computers may provide cloud-based personal assistants to the client devices. Resource requests from client devices may be context related that may be provided in response to a selected context. A resource management system schedules resource processing for requesting mobile client devices, initially, and responds to device context changes by selectively adjusting shared resource job priorities, e.g., creating a new job, pausing or restarting/resuming a respective job.

A method of context aware resource management, said method comprising: receiving requests for shared resource capacity, one or more provider computer providing said shared resource capacity, each request being from a mobile client device within a defined context; queuing a job for provisioning resources within said defined context for said each request; monitoring mobile client devices for local context changes; and whenever local context changes occur for that respective device analyzing the current local context to determine a global context; extracting job changes from global context; and selectively modifying a respective job responsive to extracted said job changes.

The provider computers may include a resource management system receiving said requests; monitoring context of said mobile client devices for context variations indicating triggering events; selectively changing shared resource priorities responsive to said triggering events; analyzing local mobile client device activity and related context history; and providing scheduling recommendations responsive to analysis results, e.g., selectively pausing and restarting shared resource processing responsive to provided said scheduling recommendations.

The resource management system is further: storing local device context history from said context monitor in a context information store, said defined context including time, device location and associated activity; creating jobs responsive to job request from said one or more mobile client devices; queuing said jobs in a job queue; and selectively pausing and restarting queued jobs and creating new jobs, responsive to said provided scheduling recommendations.

A method of context aware resource management, said method comprising: receiving requests for shared resource capacity in a cloud environment including a plurality of provider computers selectively providing cloud-based personal assistants, each request being for a handheld client device within a defined context, said defined context including time, device location and associated activity; queuing a job for provisioning resources within said defined context for said each request; monitoring handheld client devices for local context changes; and whenever local context changes occur for that respective device analyzing the current local context to determine a global context; extracting job changes from global context; and selectively modifying a respective job responsive to extracted said job changes.

The cloud environment includes a resource management system receiving said requests, monitoring context of said handheld client devices for context variations indicating triggering events; selectively changing job priorities responsive to said triggering events; analyzing local handheld client device activity and related context history; and providing scheduling recommendations responsive to analysis results, e.g., selectively pausing and restarting shared resource processing responsive to provided said scheduling recommendations.

The resource management system further: storing local device context history from said context monitor in a context information store; creating jobs responsive to job request from said one or more handheld client devices; queuing said jobs in a job queue; and selectively pausing and restarting queued jobs and creating new jobs, responsive to said provided scheduling recommendations.

A computer program product for context aware resource management, said computer program product comprising a computer usable medium having computer readable program code stored thereon, said computer readable program code causing one or more computer executing said code to: receive requests for resource capacity, each request from a mobile client device being within a defined context; queue a job for provisioning resources within the defined context for said each request; monitor mobile client devices for local context changes; and whenever local context changes occur for that respective device analyze the current local context to determine a global context; extract job changes from global context; and selectively modify a respective job responsive to extracted said job changes.

The computer readable program code causes one computer to be a resource management system: receiving said requests; monitoring context of said mobile client devices for context variations indicating triggering events; selectively changing shared resource priorities responsive to said triggering events; analyzing local mobile client device activity and related context history; and providing scheduling recommendations responsive to analysis results, e.g., selectively pausing and restarting shared resource processing responsive to provided said scheduling recommendations.

The computer readable program code further causes resource management system to be: storing local device context history from said context monitor in a context information store, said defined context including time, device location and associated activity; creating jobs responsive to job request from said one or more mobile client devices; queuing said jobs in a job queue; and selectively pausing and restarting queued jobs and creating new jobs, responsive to said provided scheduling recommendations.

A computer program product for context aware resource management, said computer program product comprising a computer usable medium having computer readable program code stored thereon, said computer readable program code causing a plurality of computers including provider computers executing said code to: receive requests for shared resource capacity in a cloud environment including a plurality of provider computers selectively providing cloud-based personal assistants, each request being for a handheld client device within a defined context, said defined context including time, device location and associated activity; queue a job for provisioning resources within said defined context for said each request; monitor handheld client devices for local context changes; and whenever local context changes occur for that respective device analyze the current local context to determine a global context; extract job changes from global context; and selectively modify a respective job responsive to extracted said job changes.

The computer readable program code causes one computer to be a resource management system receiving said requests, and causing said resource management system to: monitor context of said handheld client devices for context variations indicating triggering events; selectively change shared resource priorities responsive to said triggering events; analyze local handheld client device activity and related context history; and provide scheduling recommendations responsive to analysis results.

The computer program code further causing the resource management system to: store local device context history from said context monitor in a context information store; create jobs responsive to job request from said one or more handheld client devices; and queue said jobs in a job queue; selectively pause and restart queued jobs and creating new jobs, responsive to said provided scheduling recommendations.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
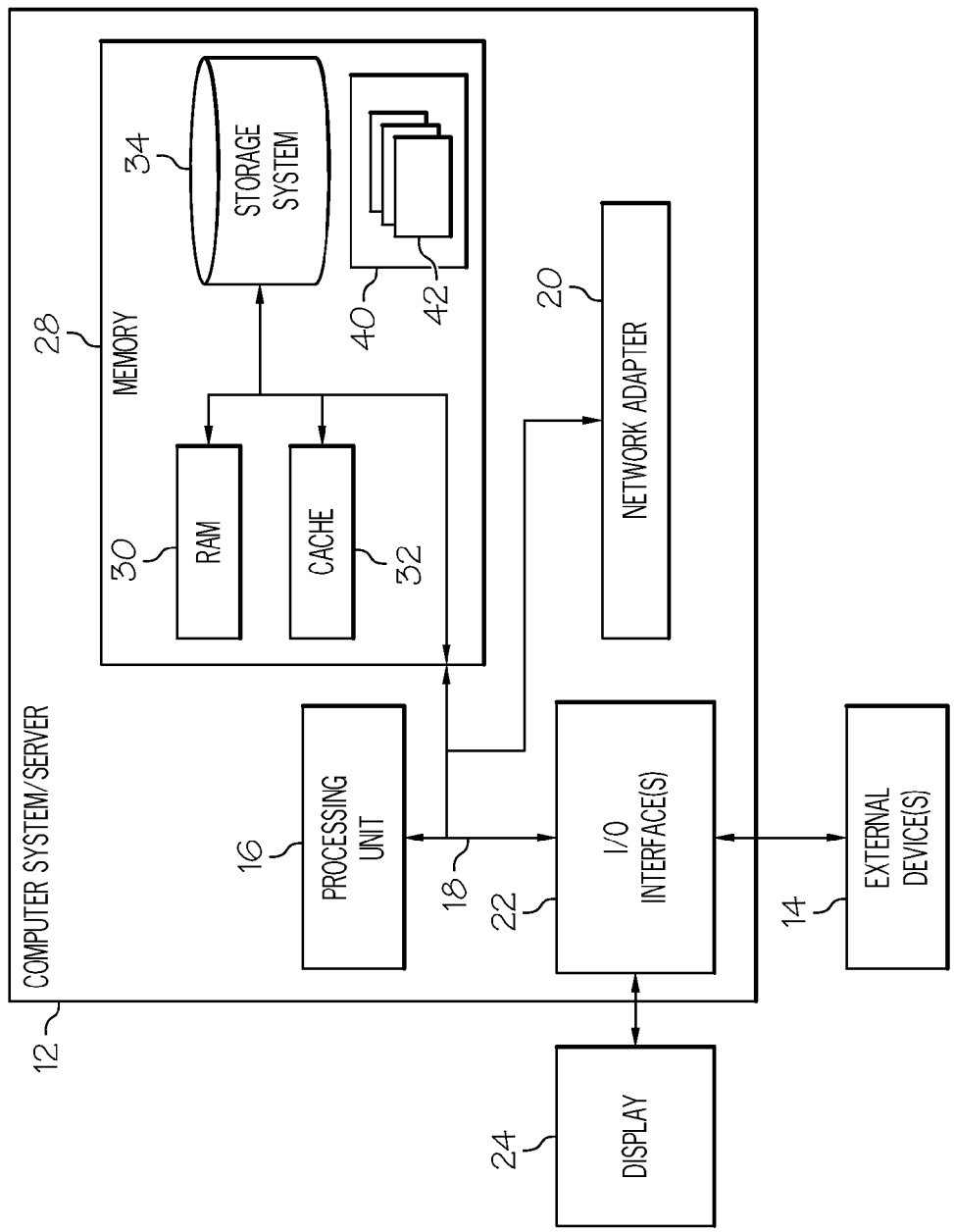
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
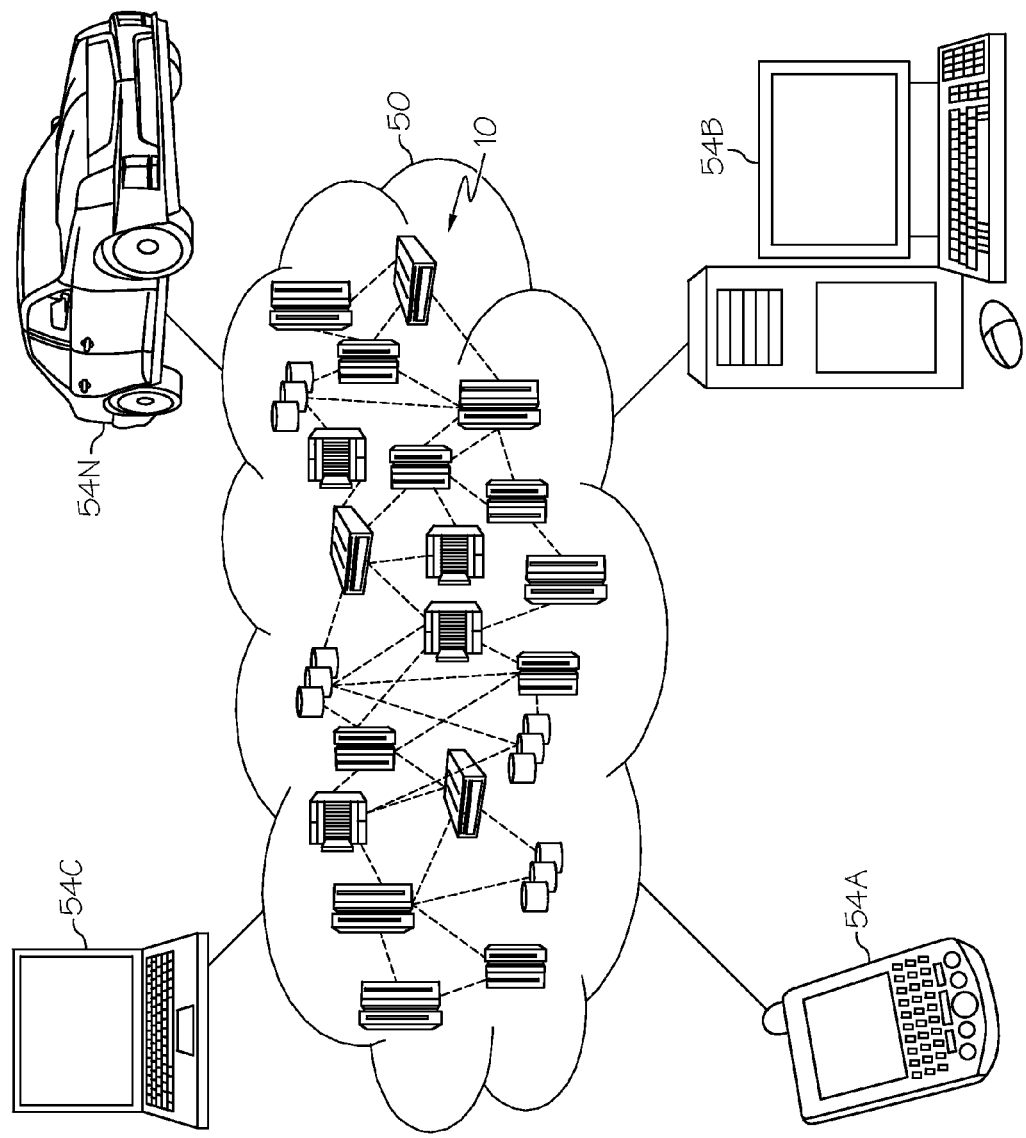
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
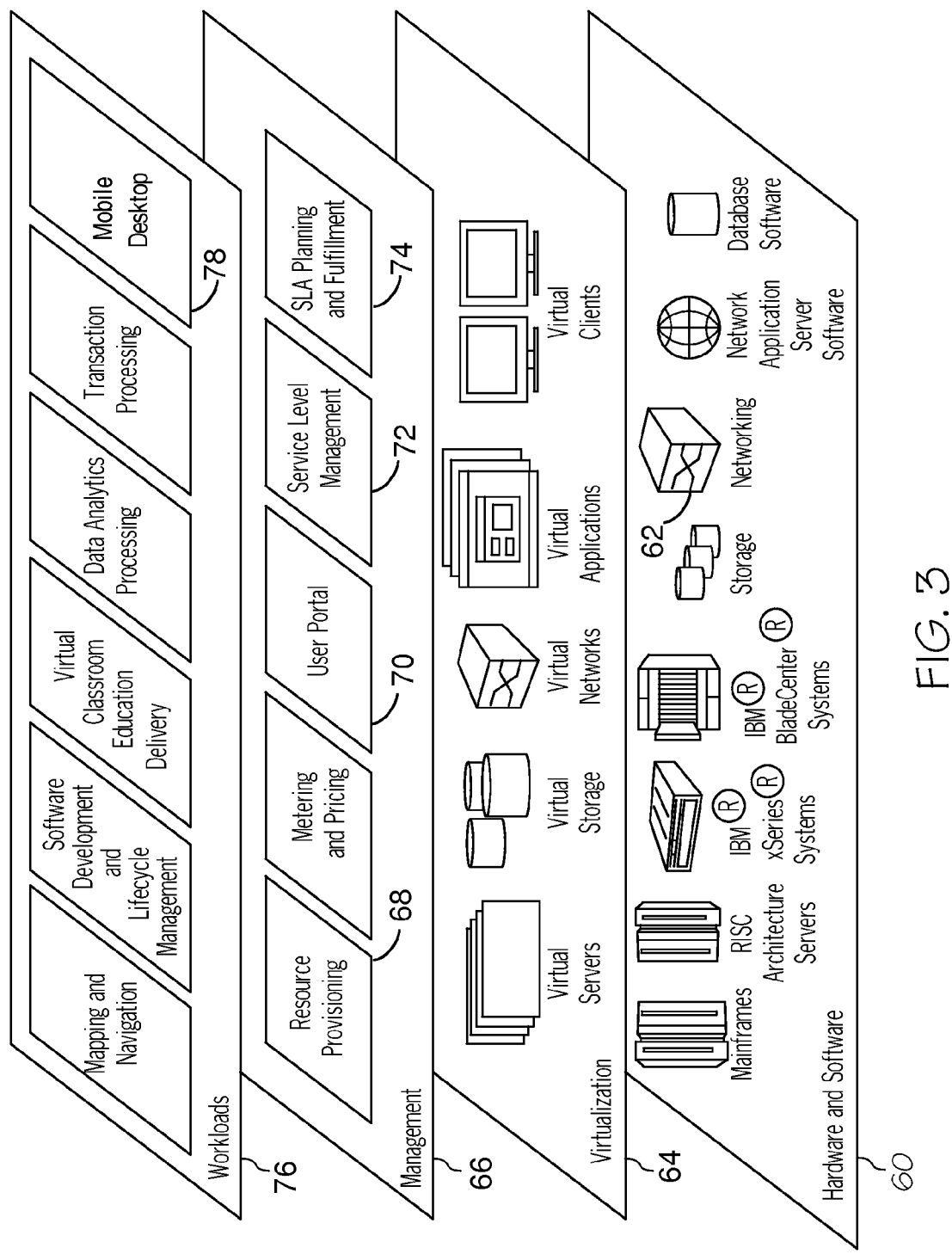
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components 62. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 64 provides an abstraction layer from which the following examples of virtual entities may be provided: virtual servers; virtual storage; virtual networks, including virtual private networks; virtual applications and operating systems; and virtual clients.

In one example, management layer 66 may provide the functions described below. Preferred, context aware resource provisioning 68 provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 70 provides access to the cloud computing environment for consumers and system administrators. Preferred, context aware service level management 72 provides cloud computing resource allocation and management such that required service levels are met. Preferred, context-aware Service Level Agreement (SLA) planning and fulfillment 74 provide pre-arrangement for, and procurement of, cloud computing resources for which a future requirement is anticipated in accordance with an SLA.

Workloads layer 76 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktops 78.

Figure 4A:
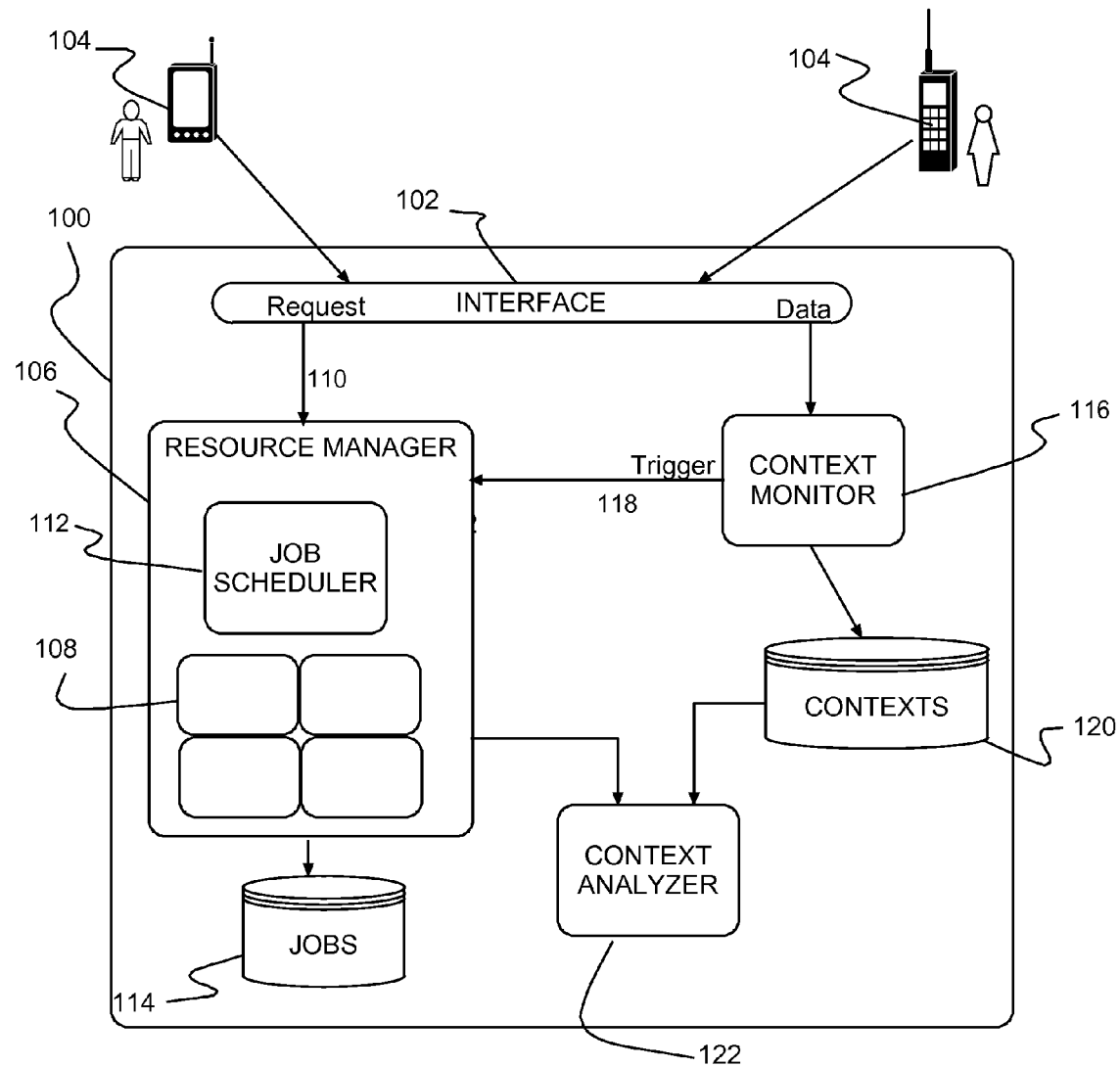
FIG. 4A shows an example of a preferred resource management system in the resource management layer.

FIG. 4A with reference to FIGS. 1-3 shows an example of a preferred resource management system 100 in resource management layer 64 with like features labeled identically. In particular, a preferred resource management system 100 combines events related to local context variations at mobile devices, e.g., 54A, 54C and/or 54N, with job prioritization in a shared IT infrastructure such as in cloud computing. The present invention cross-relates current end-user local context with context history, infrastructure utilization and resource availability, preferably, for all mobile devices associated with the respective user. Thus, a preferred system optimizes resource utilization by adjusting job priorities either actively responding to, or pro-actively responding to, sensed end-user context variations and thus, ensuring timely material delivery in an appropriate group of contexts or context area with minimal wasted resources.

So, in this example, user portal 68 includes an interface 102 to handheld devices 104, e.g., one or more cell phones 54A, a personal digital assistants, smart phones, tablet computers, laptops/netbooks 54C and/or automobile computer system 54N or any other suitable mobile device with mobile desktops 78. The preferred handheld devices 104 may connect to interface 102, for example, wired or wirelessly through networking 62, or in the case of cellular capable devices, e.g., cell phones, smart phones or tablet computers, through the cellular network. A resource manager 106 (e.g., 66 in FIG. 3) with normal resource management elements 108 (e.g., 68, 70, 72, 74 in FIG. 3), receives resource requests 110 within a given context from handheld devices 104. In addition a preferred resource manager 106 includes a client context aware job scheduler 112 that creates and queues 114 requested jobs. A context monitor 116 monitors local context for mobile clients and triggers 118 adjusting shared resource job priorities in response to deviations from specific given contexts. A context repository 120 stores current and past local context information collected from the context monitor 116. A context analyzer 122 analyzes local client activity and related contexts and provides scheduling recommendations to the job scheduler 112.

Figure 4B:
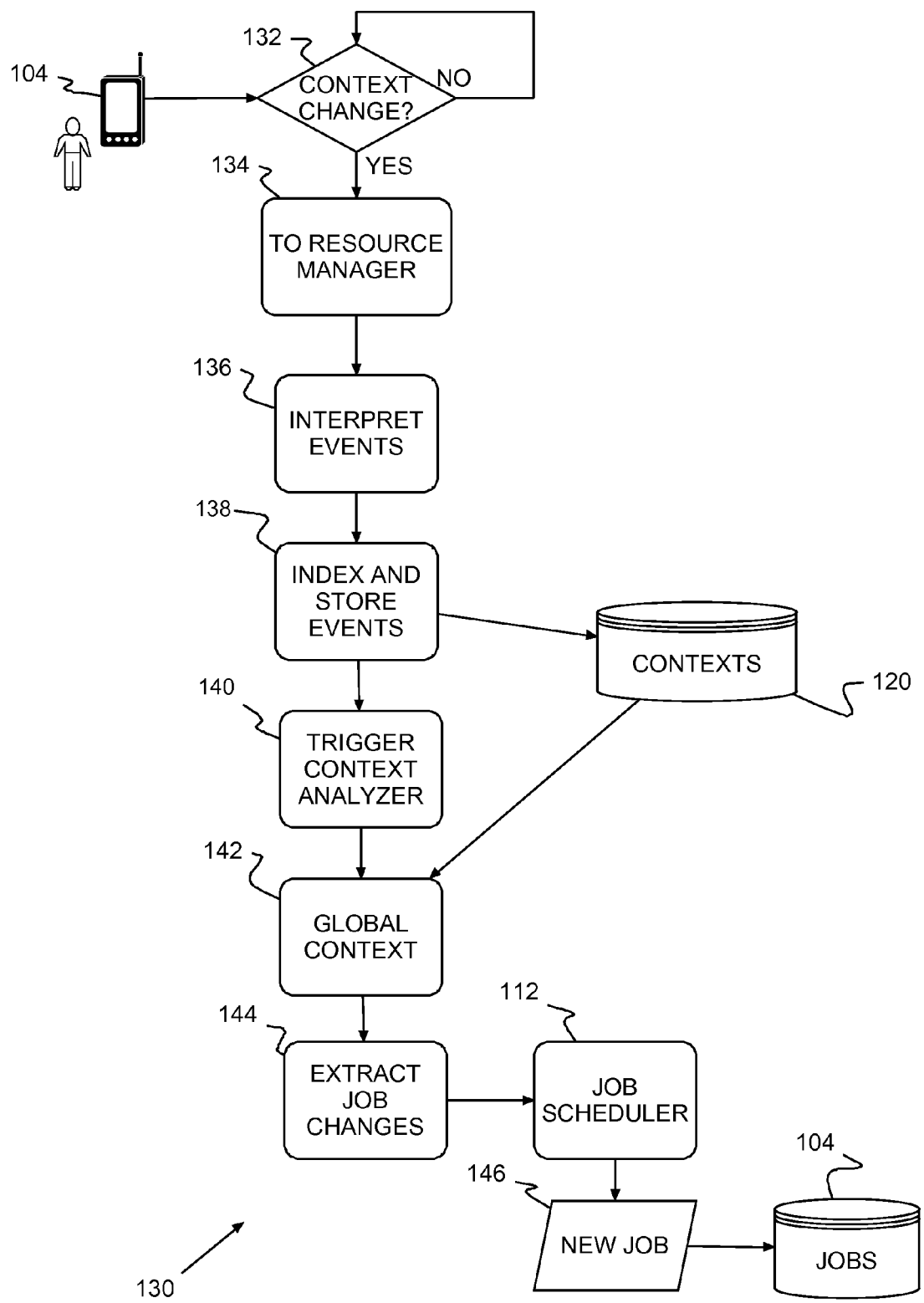
FIG. 4B shows an example of a preferred resource management system cross-relating shared resource system demands with provisioned mobile personal assistants, and responding to respective user environment context changes.

Thus, as shown in the example 130 of FIG. 4B, a preferred resource management system 100 of FIG. 4A cross-relates the shared resource system demands with provisioned mobile personal assistants, responding to context changes in the respective user environment according to a preferred embodiment of the present invention. Thus, the preferred resource management system 100 combines events related to local context variations for each end-user with historical context data in prioritizing shared Information Technology (IT) infrastructure provisions and job processing for mobile users. In particular, the preferred resource management system 100 adjusts selected job priorities for end-user context variations, pro-actively to expected context changes or responsively to changes as they occur. Preferably, the resource management system 100 adjusts job priorities for processing files (such as documents, graphs and videos), notifications, or any other type of support material to ensure delivering request material in the appropriate context or set of contexts (also called "window of opportunity" or context area), and while optimally utilizing shared IT infrastructure.

Each handheld device 104 senses 132 local context variations and captures context changes as they occur. Then, the handheld device 104 relays 134 those captured changes through communication structure, e.g., through a wired or wireless network 62, to the interface 102 in resource management system 100. The context monitor 116 interprets the context variations/changes to determine handheld device events 136. Then, the context monitor 116 indexes and stores 138 identified events in the context repository 120 and triggers 140 the context analyzer 122. The context analyzer 122 analyzes the events, forming a "global context" 142 from which it extracts job priority alteration recommendations 144. Finally, the context analyzer 122 sends the recommendations to the job scheduler 112, which processes the recommendations, creating a new job 146, pausing or restarting jobs, each time a priority is changed. Finally, any new jobs are queued 104.

Preferably, the context analyzer 122 forms an eight dimensional global context for each event, such as described by Graham et al., "Indexical Representations for Context-Aware Mobile Devices" (2003). The eight dimensions include time, absolute location, relative location (absolute and relative can be the same variable), object presence, activity, social setting, environment and culture. Preferably, each handheld device 104 module calculates context proximity conditions for each dimension in response to yes-no questions. Examples of such questions include For time: "Is the task still feasible in time?"
For absolute location: "Is the position still valid?"
For relative location: "Is the position still valid?"
For object presence: "Are objects $o_1, \ldots, o_n$ present?"
For activity: "Is the user engaged in activities $a_1, \ldots, a_n$?"
For social setting: "Is the user in any of social setting segments $ss_1, \ldots, ss_n$?"
For environment: "Are conditions $c_1, \ldots, c_n$ valid?"
For culture: "Is the user immersed in any of cultural setting $cs_1, \ldots, cs_n$?"

So, the context analyzer 122 cross-relates each current event with relevant, available situational information. The relevant, available situational information may include, for example, historical data, e.g., from context repository 120, system/server-based event context information $<G_1, \ldots, G_n>$, and existing jobs $<J_1, \ldots, J_n>$. System/server-based event context information may include, for example, personal information stored on shared information handling infrastructure, e.g., cloud infrastructure. The context analyzer 122 uses the information to calculate context proximity. This may include, for example, inferring if the current context is "near", "distant", or "out" the window of opportunity for notification delivery.

When the job scheduler 112 receives recommendations, it alters job priorities accordingly. So, if a recommendation is to change priority or create a new job, the job scheduler 112 may use any suitable state of the art algorithms and strategies to advance or slow execution. For example, the job scheduler 112 can sort jobs for execution by priority and re-sort after any priority changes. Moreover, the job scheduler 112 may designate available resources for higher priority jobs, with lower priority jobs designated to spare computing resources. Alternatively, the system may provision more resources for executing high priority jobs.

Figure 5:
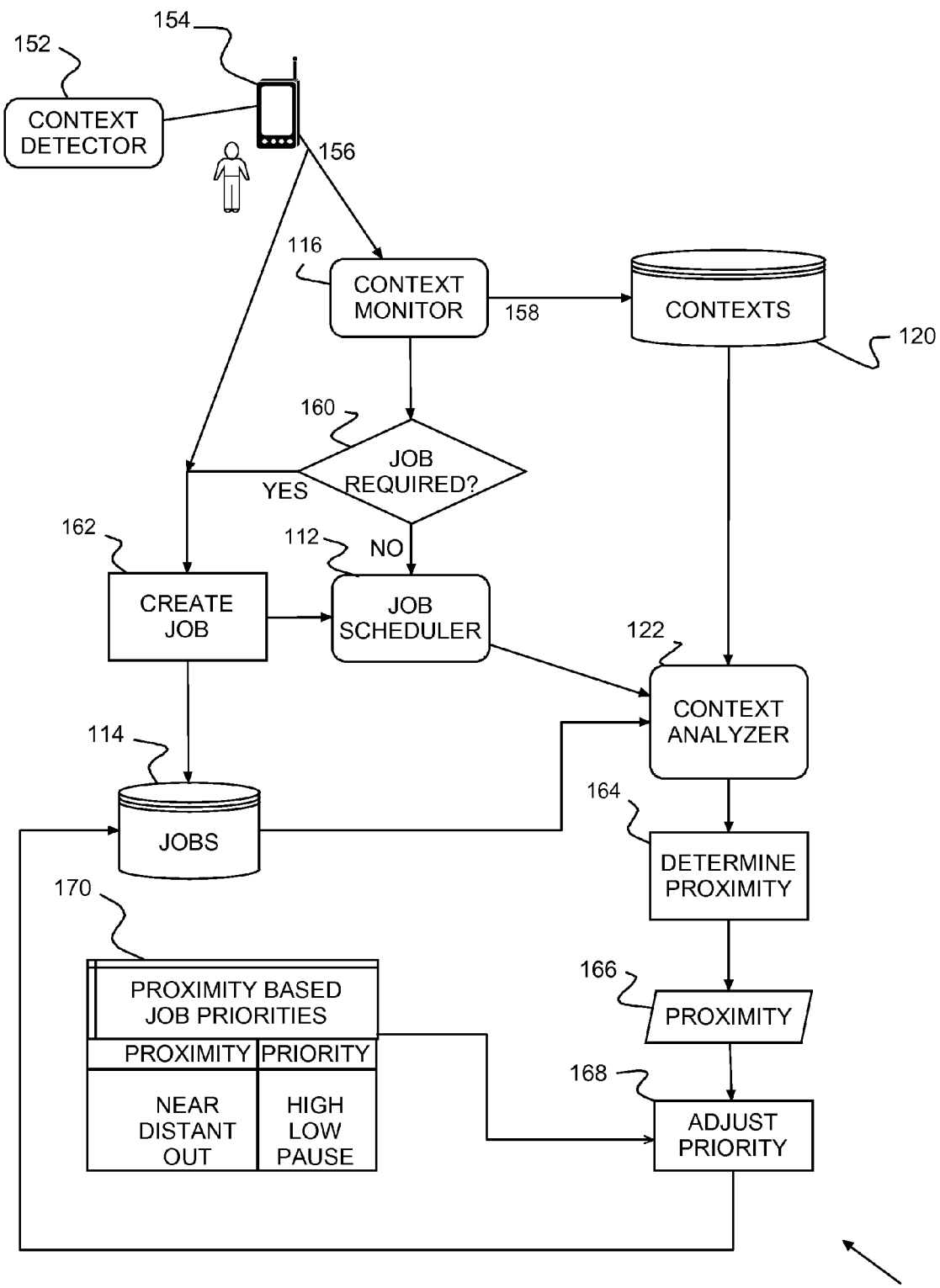
FIG. 5 shows an example of information flow in a preferred shared resource system.

FIG. 5 shows an example of information flow 150 according to a preferred embodiment of the present invention with reference to FIGS. 4A-B. In this embodiment a local context detector 152 resides in each local client device 154, and detects changes/variations in the local context. An example of a suitable context monitor is described by Koch et al., "Enhanced Deliberation Behaviour for BDI-Agents in Mobile Services" *Proceeding of the 8th International Conference on Practical Applications of Agents and Multi-Agent Systems* (PAAMS10), *Advances in Intelligent and Soft Computing* 70 (2010). Koch et al. describes a context monitor module specialized in observing environmental events, filtering relevant changes, and coordinating application processing.

Upon a change the local context detector 152 notifies 156 the shared IT infrastructure. The context monitor 116 intercepts notifications 156 and stores 158 related information in the context information repository 120. Using a simple compare, for example, the context monitor 116 also determines 160 whether the context change in each notification 156 triggers 118 an event potentially influencing currently scheduled jobs.

If so, the context analyzer 122 determines whether the context change is such as to require creating a new job. Whenever a client device makes an explicit request 110 or, when the context analyzer 122 determines whether a new job is required, the resource manager 106 creates a new job 162, defaulting to low priority. The job scheduler 112 adds the new job to the queue 114, e.g., in a job database. Even if detected context changes do not warrant creating 162 a new job, the events may affect resource scheduling. So, the context analyzer 122 notifies/triggers job scheduler 112. Upon receiving each triggering event, the job scheduler 112 iterates the respective user jobs, re-setting each job priority according to proximity. After the context analyzer 122 has re-defined priorities for all jobs, the job scheduler 112 schedules or re-schedules each job according to priority guided by a selected scheduling policy, e.g., High-Priority Job First (HPJF).

Iterating the respective user jobs begins by invoking the context analyzer 122, which gathers information from the repository 114 about the current context for the respective user. The context analyzer 122 determines 164 user proximity 166 to the job window of opportunity, e.g., how close the user is to the window. The context analyzer 122 sets/adjusts job priority 168 according to proximity based on a job priority table 170. The job priority table 170 of this example has three defined qualitative proximity levels: near, distant and out; and corresponding assignable priorities of high, low and pause. The system and method of the present invention have many real world applications.

So, in a large social setting, such as the World Cup for example, people with different nationalities may try to communicate. In such a setting there is the need for "Universal Translators." Handheld devices may be used as cloud-based universal translators with translation running on shared IT infrastructure. Thus, these handheld devices provide a local interface and may be equipped with sensors sensing the local context, e.g., what translation is needed. Thus, the preferred resource management system 100 starts translator jobs by a combination of both necessity and proximity.

So, in this example, it may be necessary to translate between languages A, B, and C. Also, the proximity requirement may be for individuals communicating in the same room with one individual speaking language C. A context variation for this example may be that sole individual leaving the room. The preferred system automatically reacts to this variation when that individual's device sends an event notification to the preferred resource manager 100 causing the job scheduler 112 to pause jobs associated with translating A to C and B to C and vice versa, reducing the workload by two thirds. Thus, the present invention captures the change of context, based on inference upon the variation of location and social setting, and influences job processing for other users.

In another example, a police officer is assigned a low priority information-gathering task for completion in a selected window, e.g., at any time within the next eight (8) hours. En route, the officer gets a call, that shots were fired in a nearby area, and the officer is diverted to that area. The preferred system is notified by the police dispatch system of the reassignment. The social context changes from a low risk to a high-risk activity, with an armed and dangerous suspect. The preferred system pauses the first task and initiates a high priority examination of the local area, providing the officer with available information, e.g., location maps, known potential police suspects, pictures of suspects and details about any victims. Thus, the preferred system adjusts to social setting and location, and initiates high priority cloud computing tasks to provide a photographic, social hierarchy, and danger analysis. Thus, officer safety and effectiveness are increased, and prior task assignment priority is changed automatically in real time for subsequent processing.

Figure 6:
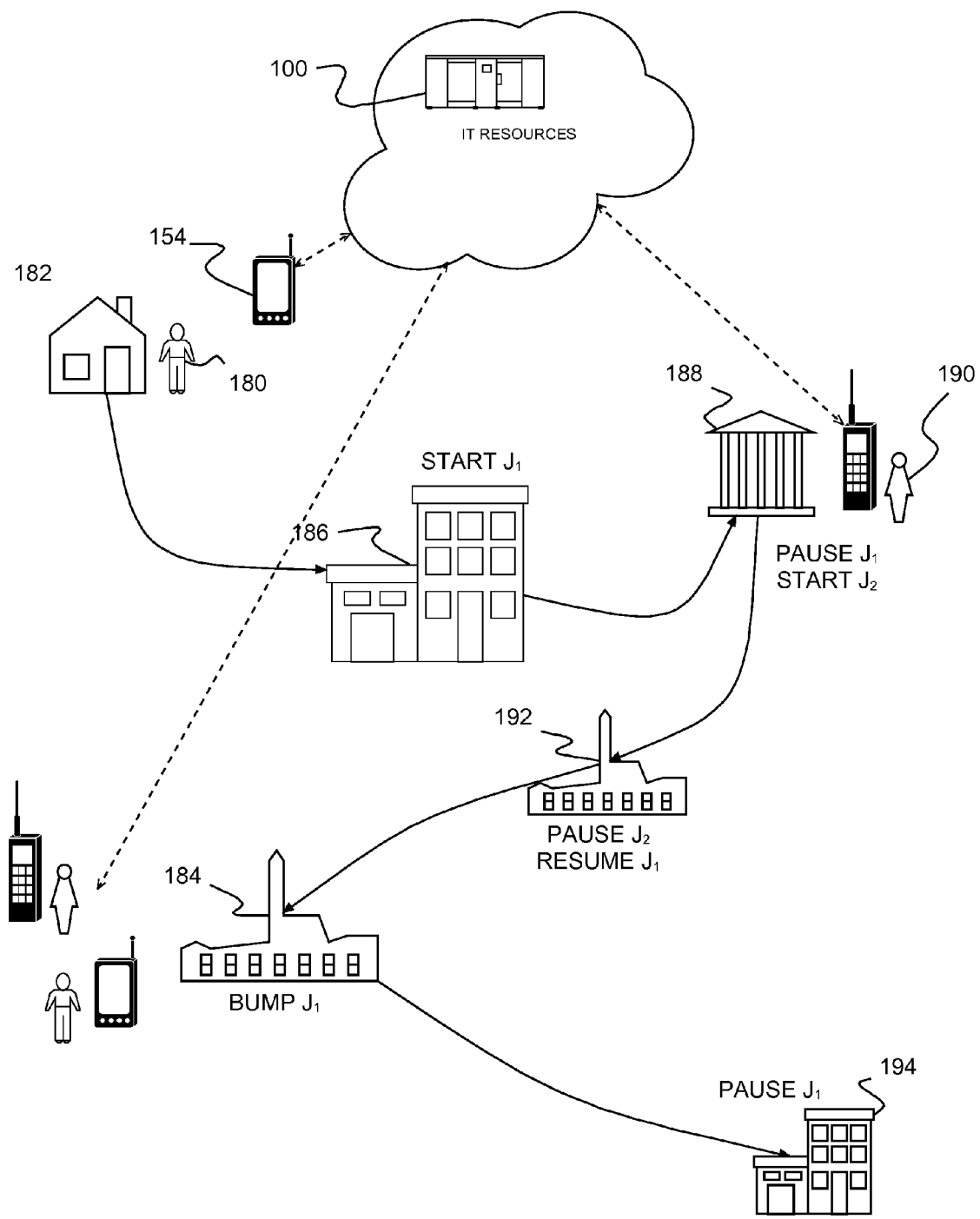
FIG. 6 shows an example of operation of a shared IT infrastructure with a preferred resource management system processing end-user jobs for handheld devices obtaining end-user context and in communication with the shared IT infrastructure.

FIG. 6 shows an example of operation of a shared IT infrastructure with a preferred resource management system (100 in FIG. 4A) processing end-user jobs for handheld devices (154 in FIG. 5), obtaining end-user context ($C_t$), and managing communication with the shared IT infrastructure. So, in this example, the device user 180 at location 182 has an activity ($A_t$), e.g., a meeting, scheduled at a future time ($T_t$) and at established location ($L_t$) 184. At that scheduled time the preferred shared resource system is to deliver to device user 180 content related to that scheduled event, e.g., reports and information material required for the meeting. Initially, the context is $<C_0:L_0, T_0, A_0, \ldots>$ with the user outside the area of interest. There is nothing yet to be done by the preferred shared resource system.

Next, the user 180 moves into location ($L_1$) 186 at time ($T_1$) with context $<C_1:L_1, T_1, A_1 \ldots>$. The preferred system concludes from the context that it is time to start a Job $J_1$ that produces the required material for the meeting. However, the system further considers a time lag for the scheduled event, and starts the job $J_1$ at low priority. When the user 180 next moves into location ($L_2$) 188 at time ($T_2$) with context $<C_2: L_2, T_2, A_2 \ldots>$, the user 180 is again out of the relevant area 182, e.g. because of absolute distance to the scheduled event at location 184. Consequently, rather than waste resources preparing for the meeting, the preferred system pauses processing $J_1$.

Also in this example at this new position 188, the user 180 engages in a conversation with a co-worker 190 and requests material for demonstration ASAP. In response to this urgent request, the system to trigger a new job $J_2$, which starts with high priority. Prior to completion of job $J_2$, however, the user 180 moves to location ($L_3$) 192, distant from co-worker 190, in the vicinity of the meeting place 184 with context $<C_3:L_3, T_3, A_3, \ldots>$. In response, considering the proximity with the target delivery point (i.e., co-worker 190 and the meeting's venue 184), the job spooler both pauses processing $J_2$ and resumes $J_1$, still at a low priority.

If the user 180 continues to move towards the meeting venue, at the location 184 with context $<C_4:L_4, T_4, A_4, \ldots>$, the system may assign $J_1$ a new priority, e.g., bumping it higher to complete for delivery at the meeting. Optionally, the system may keep $J_1$ at its current priority and deliver partial contents (i.e. completed pieces), if the nature of $J_1$ permits it. If the user 180 again moves away from the meeting venue 184, at location 194 with context $<C_5:L_5, T_5, A_5, \ldots>$, the user is out of proximity of the relevant context area 184; and the system suspends $J_1$. Thus, the preferred system captures events related to context changes in real time. Each preferred handheld device and the shared IT infrastructure cooperate to capture, communicate and interpret the real time user events, as well as prioritize and process jobs accordingly.

Thus advantageously, a preferred resource management system 100 adjusts job execution based on local context variations at mobile user devices, improving the quality of service and overall end-user experience. The preferred resource management system 100 does not waste resources processing stale job content, no longer relevant in the current context. These advantages become even more beneficial with larger and larger numbers of personal assistant jobs provisioned for devices in a highly dynamic delivery environment. Further, unlike prior approaches to context-aware processing, the present invention focuses on enhancing local processing performance with context-awareness applied to coordinating server-based task prioritization.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of context aware resource management, said method comprising:
   receiving requests for shared resource capacity, one or more provider computer providing said shared resource capacity, each request being from a mobile client device within a defined context;
   queuing a job for provisioning resources within said defined context for said each request;
   monitoring mobile client devices for local context changes; and
   whenever local context changes occur for that respective device
   analyzing the current local context to determine an eight dimensional global context, the eight dimensions including time, absolute location, relative location, object presence, activity, social setting, environment and culture;
   extracting job changes from global context; and selectively modifying a respective job responsive to extracted said job changes.

2. A method of context aware resource management as in claim 1, wherein said one or more provider computer is a plurality of provider computers in a cloud environment providing cloud-based personal assistants.

3. A method of context aware resource management as in claim 1 wherein said one or more provider computer includes a resource management system receiving said requests, said resource management system:
   monitoring context of said mobile client devices for context variations indicating triggering events;
   selectively changing shared resource priorities responsive to said triggering events;
   analyzing local mobile client device activity and related context history; and providing scheduling recommendations responsive to analysis results.

4. A method of context aware resource management as in claim 3, selectively pausing and restarting shared resource processing responsive to provided said scheduling recommendations.

5. A method of context aware resource management as in claim 4 said resource management system further: storing local device context history from said context monitor in a context information store, said defined context including time, device location and associated activity;
   creating jobs responsive to job request from said one or more mobile client devices;
   queuing said jobs in a job queue; and
   selectively pausing and restarting queued jobs and creating new jobs, responsive to said provided scheduling recommendations.

6. A method of context aware resource management as in claim 5 wherein said one or more mobile client devices include a plurality of handheld devices comprising a cell phone, a personal digital assistant, and a tablet computer.

7. A method of context aware resource management as in claim 6 wherein said cell phone is a smart phone including said personal digital assistant.

8. A method of context aware resource management, said method comprising:
   receiving requests for shared resource capacity in a cloud environment including a plurality of provider computers selectively providing cloud-based personal assistants, each request being for a handheld client device within a defined context, said defined context including time, device location and associated activity;
   queuing a job for provisioning resources within said defined context for said each request;
   monitoring handheld client devices for local context changes; and whenever local context changes occur for that respective device,
   analyzing the current local context to determine an eight dimensional global context, the eight dimensions including time, absolute location, relative location, object presence, activity, social setting, environment and culture;
   extracting job changes from global context; and
   selectively modifying a respective job responsive to extracted said job changes.

9. A method of context aware resource management as in claim 8 wherein said cloud environment includes a resource management system receiving said requests, said resource management system:
   monitoring context of said handheld client devices for context variations indicating triggering events;

selectively changing shared resource priorities responsive to said triggering events;

analyzing local handheld client device activity and related context history; and providing scheduling recommendations responsive to analysis results.

10. A method of context aware resource management as in claim 9, selectively pausing and restarting shared resource processing responsive to provided said scheduling recommendations.

11. A method of context aware resource management as in claim 10, said resource management system further:

storing local device context history from said context monitor in a context information store;

creating jobs responsive to job request from said one or more handheld client devices;

queuing said jobs in a job queue; and selectively pausing and restarting queued jobs and creating new jobs, responsive to said provided scheduling recommendations.

12. A method of context aware resource management as in claim 8 wherein said one or more handheld client devices include a plurality of handheld devices comprising a cell phone, a personal digital assistant, and a tablet computer.

13. A method of context aware resource management as in claim 12 wherein said cell phone is a smart phone including said personal digital assistant.

14. A computer program product for context aware resource management, said computer program product comprising a non-transitory computer usable medium having computer readable program code stored thereon, said computer readable program code causing one or more computer executing said code to:

receive requests for resource capacity, each request from a mobile client device being within a defined context;

queue a job for provisioning resources within the defined context for said each request;

monitor mobile client devices for local context changes; and whenever local context changes occur for that respective device;

analyze the current local context to determine an eight dimensional global context, the eight dimensions including time, absolute location, relative location, object presence, activity, social setting, environment and culture;

extract job changes from global context; and selectively modify a respective job responsive to extracted said job changes.

15. A computer program product for context aware resource management as in claim 14, wherein said one or more computer includes a resource management system:

receiving said requests;

monitoring context of said mobile client devices for context variations indicating triggering events;

selectively changing shared resource priorities responsive to said triggering events;

analyzing local mobile client device activity and related context history; and providing scheduling recommendations responsive to analysis results.

16. A computer program product for context aware resource management as in claim 15, said one or more computer selectively pausing and restarting shared resource processing responsive to provided said scheduling recommendations.

17. A computer program product for context aware resource management as in claim 16, said resource management system further:

storing local device context history from said context monitor in a context information store, said defined context including time, device location and associated activity;

creating jobs responsive to job request from said one or more mobile client devices;

queuing said jobs in a job queue; and selectively pausing and restarting queued jobs and creating new jobs, responsive to said provided scheduling recommendations.

18. A computer program product for context aware resource management as in claim 14, wherein said one or more computer is a plurality of provider computers in a cloud environment said computer readable program code causing said plurality of provider computers to provide cloud-based personal assistants.

19. A computer program product for context aware resource management as in claim 18, wherein:

said one or more computer includes said one or more mobile client devices; and said one or more mobile client devices include a plurality of handheld devices comprising a cell phone, a personal digital assistant, a smart phone, and a tablet computer.

20. A computer program product for context aware resource management, said computer program product comprising a non-transitory computer usable medium having computer readable program code stored thereon, said computer readable program code causing a plurality of computers including provider computers executing said code to:

receive requests for shared resource capacity in a cloud environment including a plurality of provider computers selectively providing cloud-based personal assistants, each request being for a handheld client device within a defined context, said defined context including time, device location and associated activity;

queue a job for provisioning resources within said defined context for said each request; monitor handheld client devices for local context changes; and whenever local context changes occur for that respective device, analyze the current local context to determine an eight dimensional global context, the eight dimensions including time, absolute location, relative location, object presence, activity, social setting, environment and culture;

extract job changes from global context; and selectively modify a respective job responsive to extracted said job changes.

21. A computer program product for context aware resource management as in claim 20, wherein said plurality of provider computers includes a resource management system receiving said requests, said code causing said resource management system to:

monitor context of said handheld client devices for context variations indicating triggering events;

selectively change shared resource priorities responsive to said triggering events;

analyze local handheld client device activity and related context history; and provide scheduling recommendations responsive to analysis results.

22. A computer program product for context aware resource management as in claim 21, said code further causing resource management system to:

store local device context history from said context monitor in a context information store;

create jobs responsive to job request from said one or more handheld client devices; and queue said jobs in a job queue;

selectively pause and restart queued jobs and creating new jobs, responsive to said provided scheduling recommendations.

23. A computer program product for context aware resource management as in claim 20, said plurality of computers further including requesting said one or more handheld client devices, and said one or more handheld client devices include a plurality of handheld devices comprising a cell phone, a personal digital assistant, and a tablet computer.

24. A computer program product for context aware resource management as in claim 23, wherein said cell phone is a smart phone including said personal digital assistant.

* * * * *